US011893497B2

(12) United States Patent
Choi et al.

(10) Patent No.: US 11,893,497 B2
(45) Date of Patent: *Feb. 6, 2024

(54) METHOD AND APPARATUS FOR ACQUIRING FEATURE DATA FROM LOW-BIT IMAGE

(71) Applicant: Samsung Electronics Co., Ltd., Suwon-si (KR)

(72) Inventors: Chang Kyu Choi, Seongnam-si (KR); Youngjun Kwak, Seoul (KR); Seohyung Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/127,891

(22) Filed: Mar. 29, 2023

(65) Prior Publication Data

US 2023/0229926 A1 Jul. 20, 2023

Related U.S. Application Data

(63) Continuation of application No. 17/507,872, filed on Oct. 22, 2021, now Pat. No. 11,636,575, which is a (Continued)

(30) Foreign Application Priority Data

May 30, 2018 (KR) .................. 10-2018-0061961

(51) Int. Cl.
*G06N 3/00* (2023.01)
*G06N 3/084* (2023.01)
(Continued)

(52) U.S. Cl.
CPC ............... *G06N 3/084* (2013.01); *G06N 3/08* (2013.01); *G06N 20/00* (2019.01); *G06T 5/001* (2013.01);
(Continued)

(58) Field of Classification Search
CPC .......... G06N 3/084; G06N 20/00; G06N 3/08; G06V 10/82; G06V 10/764; G06V 10/451;
(Continued)

(56) References Cited

U.S. PATENT DOCUMENTS 6,522,766 B1 2/2003 Ratnakar
2013/0142430 A1 6/2013 Okuno et al.
(Continued)

FOREIGN PATENT DOCUMENTS

CN 107480723 A 12/2017
JP 6-20049 A 1/1994
(Continued)

OTHER PUBLICATIONS

Frossard D., "VGG in Tensor Flow", Jun. 17, 2016, p. 1-2 (2 pages in English).
(Continued)

*Primary Examiner* — Pakee Fang
(74) *Attorney, Agent, or Firm* — NSIP Law

(57) ABSTRACT

A processor-implemented method of generating feature data includes: receiving an input image; generating, based on a pixel value of the input image, at least one low-bit image having a number of bits per pixel lower than a number of bits per pixel of the input image; and generating, using at least one neural network, feature data corresponding to the input image from the at least one low-bit image.

15 Claims, 13 Drawing Sheets

Related U.S. Application Data continuation of application No. 16/406,088, filed on May 8, 2019, now Pat. No. 11,189,015.

(51) Int. Cl.

| | | |
|---|---|---|
| *G06T 5/00* | (2006.01) | |
| *G06T 5/20* | (2006.01) | |
| *G06N 3/08* | (2023.01) | |
| *G06N 20/00* | (2019.01) | |
| *G06V 10/764* | (2022.01) | |
| *G06V 10/82* | (2022.01) | |
| *G06V 10/44* | (2022.01) | |

(52) U.S. Cl.
CPC .............. *G06T 5/20* (2013.01); *G06V 10/451* (2022.01); *G06V 10/764* (2022.01); *G06V 10/82* (2022.01); *G06F 2218/00* (2023.01); *G06T 2207/10024* (2013.01); *G06T 2207/20084* (2013.01)

(58) Field of Classification Search
CPC . G06T 5/001; G06T 5/20; G06T 2207/10024; G06T 2207/20084; G06F 2218/00
See application file for complete search history.

(56) References Cited

U.S. PATENT DOCUMENTS

| | | |
|---|---|---|
| 2016/0307072 A1 | 10/2016 | Zhou et al. |
| 2017/0206632 A1 | 7/2017 | Milanfar et al. |
| 2018/0232853 A1 | 8/2018 | Kim et al. |
| 2019/0108618 A1* | 4/2019 | Hwang .................. G06N 3/084 |
| 2019/0213433 A1 | 7/2019 | Abhishek et al. |
| 2019/0220699 A1* | 7/2019 | Gao .................... G06V 10/7715 |
| 2019/0258306 A1* | 8/2019 | Croxford ................ G06N 3/045 |
| 2019/0286990 A1* | 9/2019 | Kenney ................ G06V 10/803 |
| 2019/0294413 A1* | 9/2019 | Vantrease ............. G06F 7/5095 |
| 2020/0364833 A1 | 11/2020 | Zhao et al. |

FOREIGN PATENT DOCUMENTS

| | | |
|---|---|---|
| JP | 7-44708 A | 2/1995 |
| JP | 7-121695 A | 5/1995 |
| JP | 7-181012 A | 7/1995 |
| JP | 2003-502739 A | 1/2003 |
| JP | 2011-90708 A | 5/2011 |
| JP | 2014-92964 A | 5/2014 |
| KR | 10-2007-0119105 A | 12/2007 |
| KR | 10-2011-0098354 A | 9/2011 |
| KR | 10-2014-0061033 A | 5/2014 |
| KR | 10-2015-0037091 A | 4/2015 |
| KR | 10-1753660 B1 | 7/2017 |

OTHER PUBLICATIONS

Teng, Lin, et al., "A bit-level image encryption algorithm based on spatiotemporal chaotic system and self-adaptive." *Optics Communications* vol. 285. Issue 20 (2012): 4048-4054.

Dobhal, Tushar, et al. "Human activity recognition using binary motion image and deep learning." *Procedia computer science* vol. 58 (2015): 178-185.

Korean Office Action dated Sep. 17, 2022, in counterpart Korean Patent Application No. 10-2018-0061961 (3 pages in English, 5 pages in Korean).

* cited by examiner

METHOD AND APPARATUS FOR ACQUIRING FEATURE DATA FROM LOW-BIT IMAGE

CROSS-REFERENCE TO RELATED APPLICATIONS

This application is a continuation application of U.S. application Ser. No. 17/507,872 filed Oct. 22, 2021, which is a continuation of U.S. patent application Ser. No. 16/406,088 filed on May 8, 2019, which claims the benefit under 35 USC § 119(a) of Korean Patent Application No. 10-2018-0061961 filed on May 30, 2018 in the Korean Intellectual Property Office, the entire disclosure of which is incorporated herein by reference for all purposes.

BACKGROUND

1. Field

The following description relates to a method and apparatus with feature data generation.

2. Description of Related Art

Various image analysis techniques have been developed to acquire various features or feature values from an image. Features of the image may be used to detect a location of a desired object in the image or used to determine a similarity between images. The features of the image may be extracted using a feature detection algorithm, for example, scale invariant feature transform (SIFT), histogram of oriented gradient (HOG), local binary pattern (LBP), modified census transform (MCT), and/or edge detection.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of generating feature data includes: receiving an input image; generating, based on a pixel value of the input image, at least one low-bit image having a number of bits per pixel lower than a number of bits per pixel of the input image; and generating, using at least one neural network, feature data corresponding to the input image from the at least one low-bit image.

The at least one low-bit image may include at least one binary image.

The generating of the at least one low-bit image may include generating the at least one binary image by dividing binary bit values of the pixel value of the input image based on a bit value level.

The generating of the at least one low-bit image may include generating a binary image, of the at least one binary image, for each bit value level from a highest bit to a lowest bit of the binary bit values of the pixel value of the input image.

The at last one binary image may include a binary image representing a binary bit value corresponding to a highest bit of the binary bit values of the pixel value of the input image and at least one binary image representing a binary bit value corresponding to a bit lower than the highest bit.

The generating of the at least one low-bit image may include: generating, based on the pixel value of the input image, a number of low-bit images, of the at least one low-bit image, corresponding to the number of bits per pixel of the input image.

The input image may be a grayscale image.

The generating of the at least one low-bit image may include: generating, in response to the input image being a color image including a plurality of color channels, a plurality of color channel images by dividing the color image for each of the color channels; and generating, for each of the color channel images, a low-bit image, of the at least one low-bit image, having a number of bits per pixel lower than a number of bits per pixel of the color channel image based on a pixel value of the color channel image.

The generating of the at least one low-bit image may include: generating a binary image, of the at least one low-bit image, for each bit value level from a highest bit to a lowest bit of binary bit values corresponding to a pixel value of each of the color channel images.

The generating of the at least one low-bit image may include: generating the at least one low-bit image by applying an edge filter to the input image.

The generating of the at least one low-bit image may include: generating low-bit images, of the at least one low-bit image, by applying, to the input image, a number of different edge filters corresponding to the number of bits per pixel of the input image.

The generating of the feature data may include: generating a feature map corresponding to each of the at least one low-bit image by applying an image filter to the at least one low-bit image in the neural network; and generating the feature data based on the feature map, wherein a coefficient of the image filter includes any one or any combination of any two or more of a binary, a bipolar, and a ternary data type.

The at least one low-bit image may include a plurality of low-bit images, each corresponding to a same bit value level among low-bit images of color channel images, and each corresponding to a different color channel image of the color channel images.

The method of claim 12, wherein the generating of the feature data based on the feature map comprises: generating a pooled value of the feature map by pooling values of the feature map; and performing ternarization on the pooled value of the feature map.

A non-transitory computer-readable storage medium may store instructions that, when executed by one or more processors, cause the one or more processors to perform method.

In another general aspect, an apparatus for generating feature data includes: one or more processors configured to: receive an input image; generate, based on a pixel value of the input image, at least one low-bit image having a number of bits per pixel lower than a number of bits per pixel of the input image; and generate, using at least one neural network, feature data corresponding to the input image from the at least one low-bit image.

The at least one low-bit image may include at least one binary image.

For the generating of the at least one low-bit image, the one or more processors may be configured to generate the at least one binary image by dividing binary bit values of the pixel value of the input image based on a bit value level.

For the generating of the at least one low-bit image, the one or more processors may be configured to: generate, in response to the input image being a color image including a plurality of color channels, a plurality of color channel images by dividing the color image for each of the color channels, and generate, for each of the color channel images, a low-bit image, of the at least one low-bit image, having a number of bits per pixel lower than a number of bits per pixel of the color channel image, based on a pixel value of the color channel image.

For the generating of the at least one low-bit image, the one or more processors may be configured to generate low-bit images, of the at least one low-bit image, by applying, to the input image, a number of different edge filters corresponding to the number of bits per pixel of the input image.

For the generating of the feature data, the one or more processors may be configured to: generate a feature map corresponding to each of the at least one low-bit image by applying an image filter to the at least one low-bit image in the neural network; and generate the feature data based on the feature map, wherein a coefficient of the image filter includes any one or any combination of any two or more of a binary, a bipolar, and a ternary data type.

In another general aspect, a processor-implemented method of generating feature data includes: receiving a feature map of an input image including pixels having a plurality of bit value levels; generating, for each of the bit value levels, a binary feature map including binary pixel values corresponding to pixels of the feature map that include a bit of the bit value level; and generating, using a neural network, feature data corresponding to the input image based on the generated binary feature maps.

The generating of the feature data may include performing convolution operations between one or more image filters and the binary feature maps.

The method may further include performing an image recognition for the input image based on the generated feature data.

Other features and aspects will be apparent from the following detailed description, the drawings, and the claims.

Figure 1:
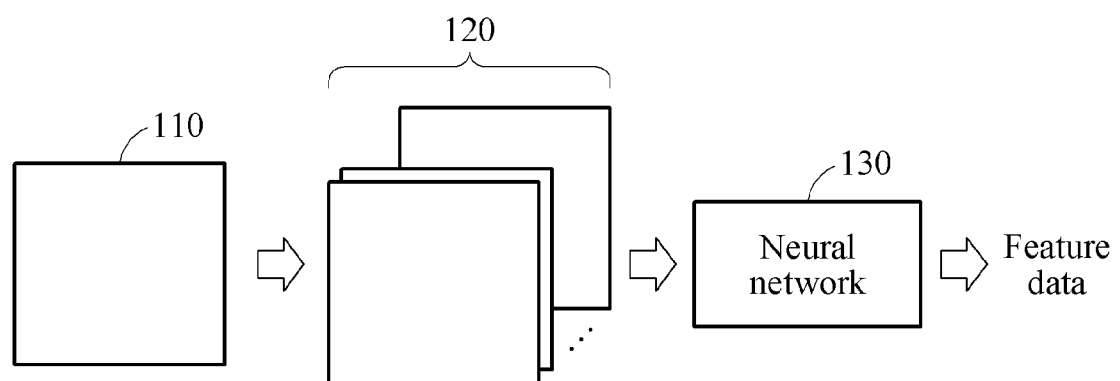
FIG. 1 illustrates an example of a process of acquiring feature data.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of embodiments, detailed description of well-known related structures or functions will be omitted when it is deemed that such description will cause ambiguous interpretation of the present disclosure.

FIG. 1 illustrates an example of a process of acquiring feature data.

For example, in the present disclosure, apparatuses may be described as implementing convolutional neural networks (CNNs), e.g., based on convolutions using previously trained (hereinafter "original") parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the CNN, as well as use the trained CNN and/or selectively implemented CNN in an example, filtering, detection, recognition, rejection, verification, classification, or other such 'interpretative' operations or objectives the respective layers or overall CNN are trained to perform. Herein, it is also noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, a neural network apparatus may acquire such trained parameters corresponding to one or more layers included in a neural network, e.g., the herein discussed example CNN type of neural network, noting that embodiments are not limited thereto. For example, the neural network apparatus may acquire parameters, e.g., as determined by the neural network apparatus during example training of the neural network by the neural network apparatus, from memory, or through external request or provision. Additionally, the neural network apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The neural network apparatus may also be provided or made available the kernel, kernel element, and/or other connection weight vectors, matrix or matrices, or other format kernels, kernel elements, and/or connection weights, as a result of the example training of the neural network by the neural network apparatus or by another processing apparatus or server, for example. The neural network apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed filtering, detection, recognition, verification, or rejection, such as image recognition or verification, translation or rejection, or input data binary or multi-class classification, clustering, pattern observation, transformation, and/or regression, as well as any other trained objective of the neural network. Thus, as a non-limiting examples, in varying embodiments, the neural network may be trained for image or object detection, recognition, identification, rejection, or discrimination. Thus, based on the training data and desired interpretation objective, the architecture, selective connections between neighboring nodes and/or kernels, kernel elements, or other connections within layers may be varied during training by the neural network apparatus until the neural network is trained to a desired acceptability for the desired interpretation objective. For example, convolutional (or CNN) layers of the neural network may be trained for image or object filtering, detection, recognition, verification, or rejection, and thus the respective convolutional kernel elements, e.g., for varying feature extractions through feature kernels, may be trained to an original desired acceptability for the image or object filtering, detection, recognition, verification, or rejection operations. The neural network may also include a different type of neural network and merely include one or more convolutional layers, e.g., for selective feature extraction, for other objectives. Thus, herein, though embodiments may be discussed from the perspective of a neural network apparatus, such reference to CNNs is not intended to be limiting of the apparatus to only implementing CNNs. Returning to the training of the neural network, the resultant kernels, kernel elements, and/or other connection weights of the trained neuro network may be referred to as parameters of the neural network, e.g., demonstrated as at least trained kernel elements of a convolutional layer or operation of the CNN. For example, the neural network may be trained based on the labeled input image information or desired corresponding output images, filtering, classifications, or geometric parameters, such as through a backpropagation algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training and/or recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. As noted above, herein such trained kernels, or kernel elements, will be referred to as "original" weights. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyperparameters may further include information of the configuration and values of any bias and/or contextual nodes in the neural network, corresponding activation functions of the nodes, types of nodes, such as long short-term memory nodes, gated linear unit nodes, or merely nodes configured to perform a single activation function for a summation of inputs, and define any or any further recurrent structures of the neural network, which may vary depending on embodiment and interpretation objective of the trained neural network.

Thus, referring to FIG. 1, an apparatus for acquiring feature data may acquire feature data from an input image 110 such as a gray (e.g., grayscale) image and/or a color image. Hereinafter, the apparatus for acquiring feature data may also be referred to as a feature data acquiring apparatus. The feature data may be an image feature acquired based on a pixel value of the input image 110 and used for object recognition or object authentication. The feature data acquiring apparatus may be an apparatus for acquiring or extracting feature data from the input image 110 and correspond to various computing apparatuses including a processor.

The apparatus may acquire the feature data from the input image 110 using a neural network 130. The neural network 130 may output a value calculated using internal parameters, for example, weights of nodes based on input data. The internal parameters of the neural network 130 may be determined through a training process. In the training process, when training data may be input to the neural network 130, the internal parameters of the neural network 130 may be adjusted such that the neural network 130 outputs a desired value corresponding to the training data. Through the training process performed on numerous items of training data, the internal parameters may be adjusted such that the neural network 130 outputs a more desirable value.

The neural network 130 may be, for example, a convolutional neural network (CNN) including at least one convolutional layer that may perform a preprocessing, and additionally may include neural network layers of, e.g., a feedforward neural network that uses an output of the preprocessing as an input. The convolutional layer may extract features from data transferred to the convolutional layer through a convolution operation. The neural network layers may include a pooling layer to abstract an input space and reduce a dimension of data and a feedforward layer to classify features transferred from a lower neural network layer. The neural network 130 may have, for example, a structure in which the convolutional layers and the pooling layers are arranged alternately, and the feedforward layers are disposed last. For example, an input image 110 may be input to a convolutional layer, an output thereof may be input to a pooling layer, an output thereof may be input to another convolutional layer, an output thereof may be input to another pooling layer, an output thereof may be input to a feedforward neural network including a plurality of layers, wherein an output of the feedforward neural network may be an image recognition result. A structure of the neural network 130 is not limited to the example and thus, various structures are applicable thereto.

When acquiring the feature data, the apparatus may decompose the input image 110 into at least one low-bit image 120 having a number of bits lower than a number of bits per pixel of the input image 110 and may acquire the feature data corresponding to the input image 110 from the at least one low-bit image 120 using the neural network 130. For example, the apparatus may decompose the input image 110 into a set of binary images of which pixel values are represented by 0 or 1 and may input image data or the pixel values of the binary images to the neural network 130. The neural network 130 may output the feature data through an operation based on the internal parameters. As such, the low-bit image 120 may be used to extract the feature data, thereby simplifying the operation and reducing an amount of operations compared to a typical feature data extraction performed on, e.g., the input image 110 having a higher number of bits per pixel than the low-bit image 120. Accordingly, by reducing the amount of operations, a calculation speed of one or more processors of the apparatus may be improved, and energy consumption of the apparatus may be reduced.

Hereinafter, a process of acquiring feature data using the apparatus based on the low-bit image 120 will be further described with the drawings.

Figure 2:
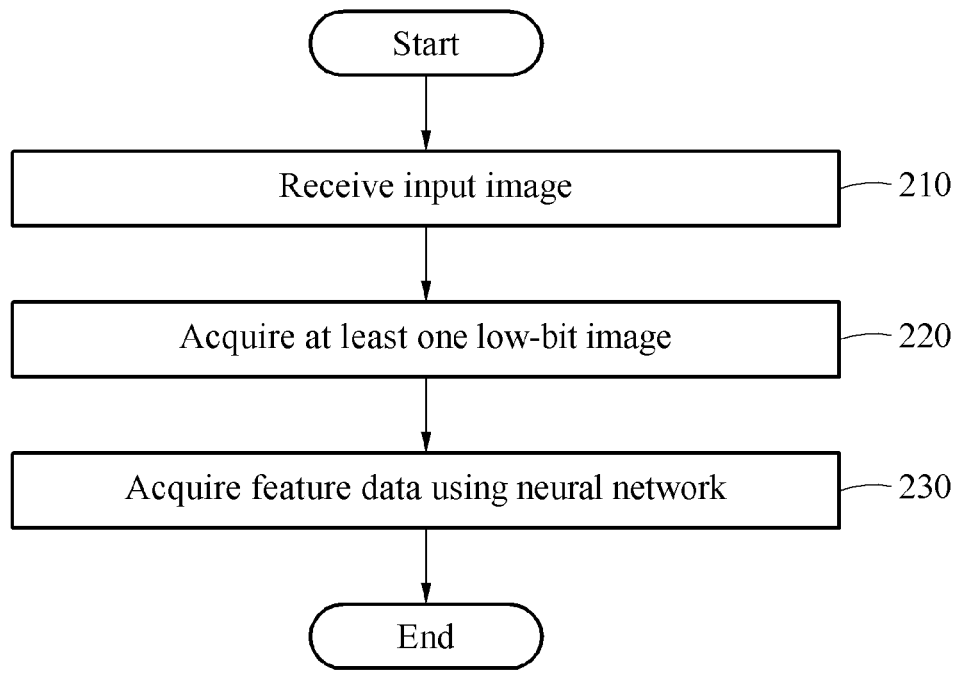
FIG. 2 illustrates an example of a method of acquiring feature data.

FIG. 2 illustrates an example of a method of acquiring feature data.

Referring to FIG. 2, in operation 210, an apparatus for acquiring feature data receives an input image. The input image may be an image, for example, a gray image or a color image that is a target for extracting feature data. The apparatus may perform an image preprocessing on the input image. The image preprocessing may include at least one process for processing the input image to be a form suitable for extracting the feature data. The image preprocessing may include processes of, for example, adjusting a size of the input image, rotating the input image, removing noise, removing a background region, correcting distortion in the input image, and/or cropping a region in the input image.

In operation 220, the apparatus may acquire at least one low-bit image from the input image. The apparatus may acquire at least one low-bit image having a number of bits lower than a number of bits per pixel of the input image based on a pixel value of the input image. For example, low-bit images corresponding to the number of bits per pixel of the input image may be acquired based on the pixel value of the input image. When the input image is a gray image of which the number of bits per pixel is 8 bits, the apparatus may divide the gray image into eight binary images, each having 1 bit per pixel.

In one example, the apparatus may acquire at least one binary image by dividing binary bit values corresponding to each pixel value of the input image based on a bit value level. Through this, the apparatus may acquire binary images for each bit value level from a highest bit to a lowest bit of the binary bit values corresponding to the pixel value of the input image. The binary images may include a binary image representing a binary bit value corresponding to the highest bit of the binary bit values corresponding to the pixel value of the input image and binary images representing binary bit values corresponding to bits lower than the highest bit.

In another example, the apparatus may acquire a low-bit image by applying an edge filter to the input image. For example, the apparatus may acquire low-bit images by applying, to the input image, different edge filters corresponding to the number of bits per pixel of the input image. In this example, binarization may be performed on a result image to which the edge filter is applied to acquire a low-bit image of a binary image. When the input image is a gray image of which the number of bits per pixel is 8 bits, the apparatus may acquire eight binary images by binarizing result images obtained by applying eight different edge filters to the gray image.

In still another example, when the input image is a color image, the apparatus may acquire a plurality of color channel images by dividing the color image for each color channel. Also, the apparatus may acquire at least one low-bit image having a number of bits lower than a number of bits per pixel of a color channel image based on a pixel value of each of the color channel images. For example, the apparatus may acquire binary images for each bit value level from a highest bit to a lowest bit of the binary bit values corresponding to each pixel value of each of the color channel image. When the input image is an RGB color image of which a number of bits per pixel is 24 bits (that is, 3 bytes), the apparatus may acquire three color channel images by dividing the RGB color image for each of three color channels including red (R), green (G), and blue (B). In this example, the number of bits per pixel of each of the color channel images may be 8 bits (that is, 1 byte). Similarly, as described in terms of the decomposing of the gray image, the apparatus may divide each of the color channel images into eight binary images having 1 bit per pixel. Through this, 24 binary images may be generated.

In operation 230, the apparatus may acquire the feature data corresponding to the input image from at least one low-bit image using a neural network. A pixel value of the at least one low-bit image (for example, a binary image) may be input to the neural network. The neural network may output the feature data such as a feature vector. When the neural network is a convolutional neural network, a feature map corresponding to each low-bit image may be generated by applying an image filter (e.g., a weight or a kernel) to the corresponding low-bit image and feature data may be determined based on the feature map. The feature map may be generated through a convolution operation using a convolutional layer of the neural network, and a size of the feature map may be reduced using a pooling layer. The neural network may have a structure in which the convolutional layer, a rectified linear unit (ReLU) layer having a characteristic of an activation function, and the pooling layer are repetitively arranged and combined.

A coefficient or weight of the image filter may have a data type of any one of, for example, binary, bipolar, and ternary. When a data type of a coefficient is binary, the coefficient may have a value of 0 or 1. When a data type of a coefficient is bipolar, the coefficient may have a value of −1 or 1. When a data type of a coefficient is ternary, the coefficient may have a value of −1, 0, or 1. When an image input to the neural network is a binary image, a data type of a feature map generated in an intermediate processing stage of the neural network may be determined based on the data type of the coefficient of the image filter. For example, when the data type of the coefficient of the image filter is binary, the data type of the feature map may be determined to be binary. Also, when the data type of the coefficient of the image filter is ternary, the data type of the feature map may be determined to be ternary. Since the binary, bipolar, and ternary types have a small number of bits, an image filter including a coefficient of any one of binary, bipolar, and ternary types may be used to advantageously reduce an amount of operation and increase a processing speed.

As such, by acquiring the feature data based on the low-bit image having the number of bits lower than the number of bits per pixel of the input image, the amount of operation and energy consumption may be advantageously reduced. When the binary image is used as the low-bit image, a logic multiplication operation may be implemented by a logical addition operation in obtaining the feature data, so that the amount of operation may be advantageously reduced, and the processing speed may be advantageously increased.

Figure 3:
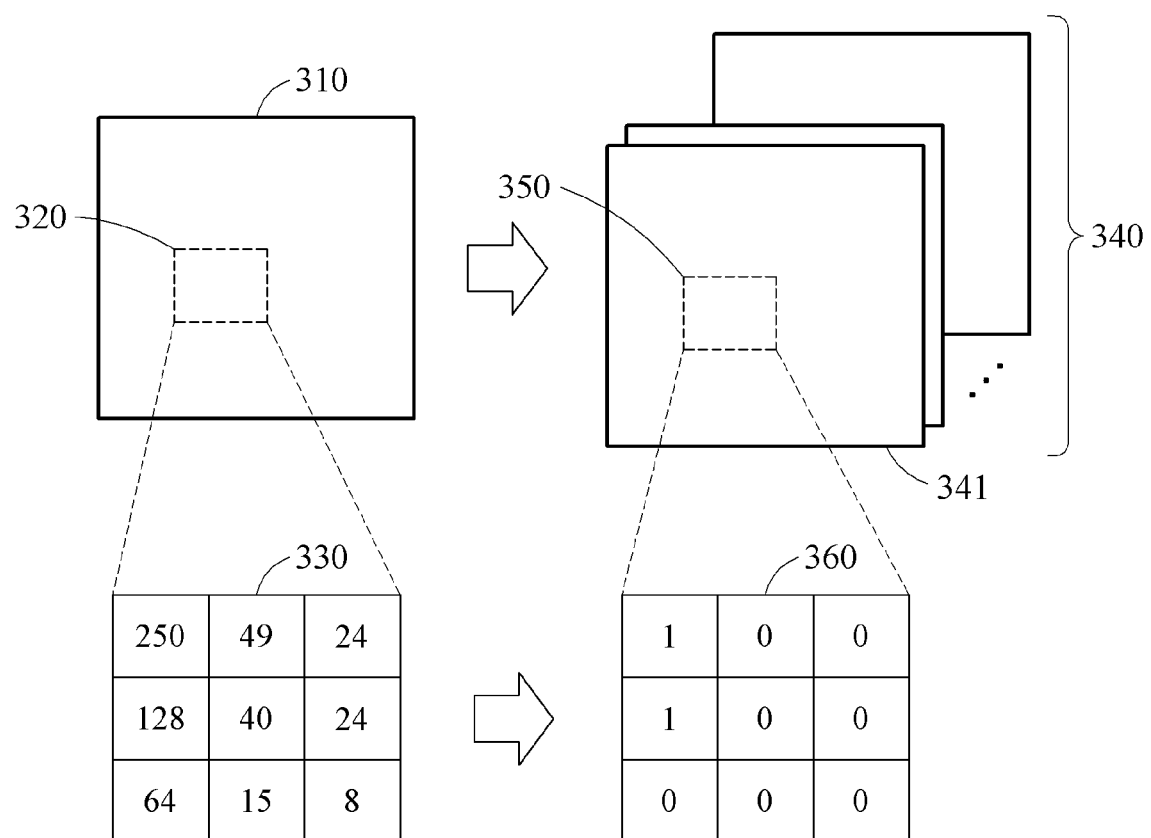
FIGS. 3 and 4 illustrate examples of acquiring a low-bit image.
Figure 4:
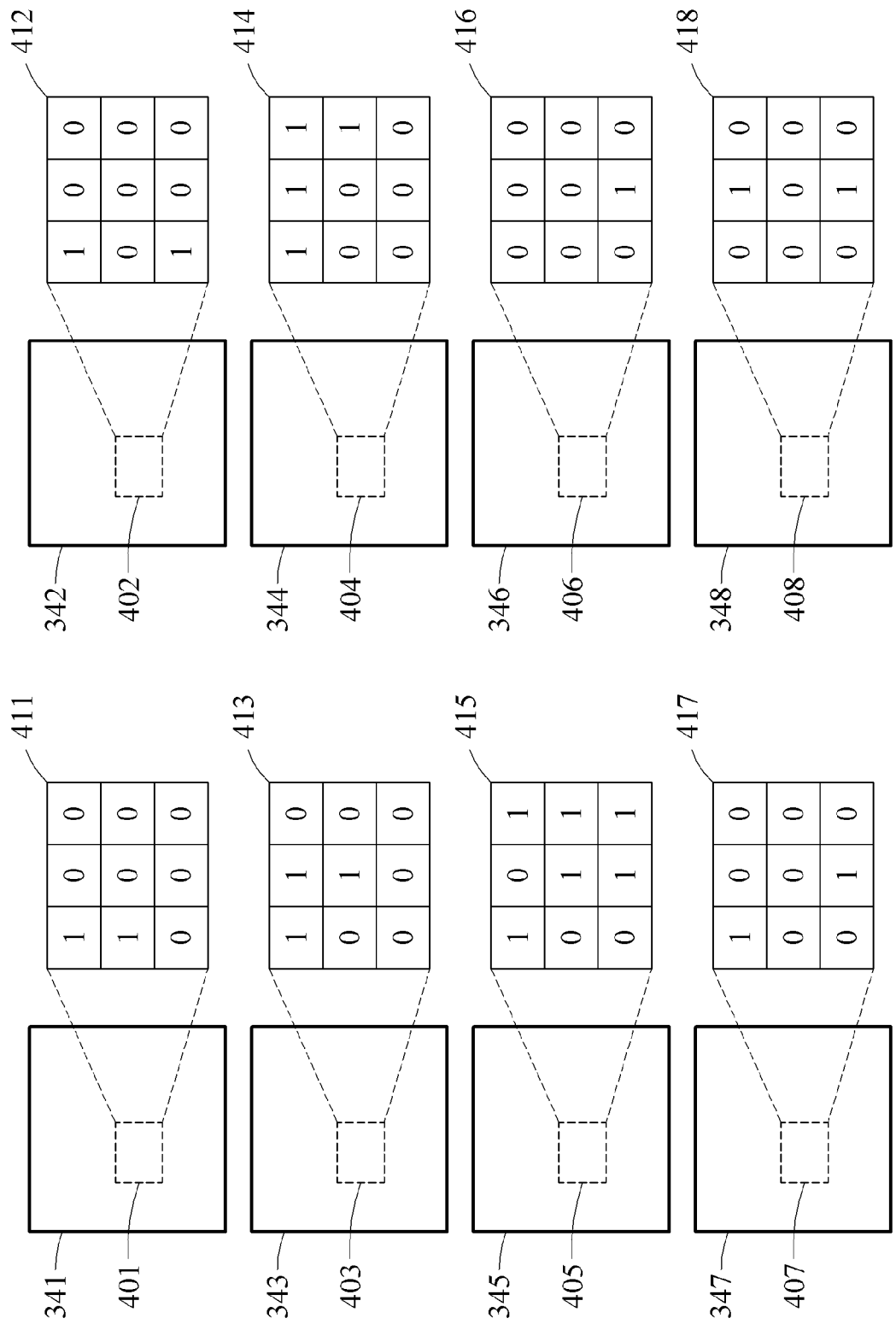

FIGS. 3 and 4 illustrate examples of acquiring a low-bit image.

Referring to FIG. 3, an input image 310 may be a gray (e.g., grayscale) image and a number of bits per pixel of the input image 310 may be 8 bits. FIG. 3 illustrates pixel values 330 of a partial area 320 of the input image 310. The partial area 320 may include nine pixels, each having a pixel value of 8 bits. The apparatus may acquire eight binary images corresponding to the number of bits per pixel of the input image 310 by dividing binary bit values corresponding to each pixel value of the input image 310 based on a bit value level. A binary image set 340 may include the eight binary images, for example.

A binary image set 340 may include a binary image 341. The binary image 341 may be a binary image representing a binary bit value corresponding to a highest bit of the binary bit values for each pixel value of the input image 310. As illustrated in the drawing, a corresponding area 350 of the binary image 341 corresponding to the partial area 320 of the input image 310 may have pixel values 360. Among the nine pixel values included in the pixel values 330, pixel values of "250" and "128" have "1" as the binary bit value corresponding to the highest bit, and remaining pixel values have "0" as the binary bit value corresponding to the highest bit. For example, as the binary bit value of decimal "250" (that is, "11111010") and the binary bit value of decimal "128" (that is, "10000000") each include a binary bit value corresponding to the eight bit, the pixel values 360 that correspond to the pixel values "250" and "128" of pixel values 330 are determined to be "1". Likewise, as shown in the pixel values 360 of the corresponding area 350, pixel values of the corresponding area 350 of the binary image 341 are determined.

Binary images corresponding to each bit value level from the highest bit to the lowest bit of the binary bit values corresponding to each of the pixel values of the input image 310 may be acquired. In this example, an ith binary image may include binary bit values corresponding to an ith bit value level among the binary bit values corresponding to the each of the pixel values of the input image 310. FIG. 4 illustrates pixel values corresponding to each corresponding areas corresponding to the partial area 320 in each of the binary images included in the binary image set 340.

FIG. 4 illustrates pixel values 411, 412, 413, 414, 415, 416, 417, and 418 of corresponding areas 401, 402, 403, 404, 405, 406, 407, 408 of eight binary images 341, 342, 343, 344, 345, 346, 347, 348 included in the binary image set 340. The corresponding areas 401, 402, 403, 404, 405, 406, 407, and 408 are areas corresponding to the partial area 320 of the input image 310. The binary image 341 may be a binary image representing a binary bit value corresponding to a highest bit of binary bit values corresponding to each pixel value of an input image. The binary image 342 may be a binary image representing a binary bit value corresponding to a bit subsequently lower than the highest bit. In terms of a bit level subsequently lower than the highest bit, among nine pixel values included in the pixel values 330, pixel values of "250" and "64" have "1" as the binary bit value corresponding to the highest bit, and remaining pixel values have "0" as the binary bit value corresponding to the highest bit. As illustrated in FIG. 4, the corresponding area 402 of the binary image 342 may have pixel values 412. For example, as the binary bit value of decimal "250" (that is, "11111010") and the binary bit value of decimal "64" (that is, "1000000") each include a binary bit value corresponding to the seventh bit, the pixel values 412 that correspond to the pixel values "250" and "64" of pixel values 330 are determined to be "1". The binary image 348 may be a binary image representing a binary bit value corresponding to a lowest bit. Among the nine pixel values included in the pixel values 330, pixel values of "49" and "15" have "1" as the binary bit value corresponding to the lowest bit, and remaining pixel values have "0" as the binary bit value corresponding to the lowest bit. Thus, as illustrated in FIG. 4, the corresponding area 408 of the binary image 348 may have the pixel values 418.

Figure 5:
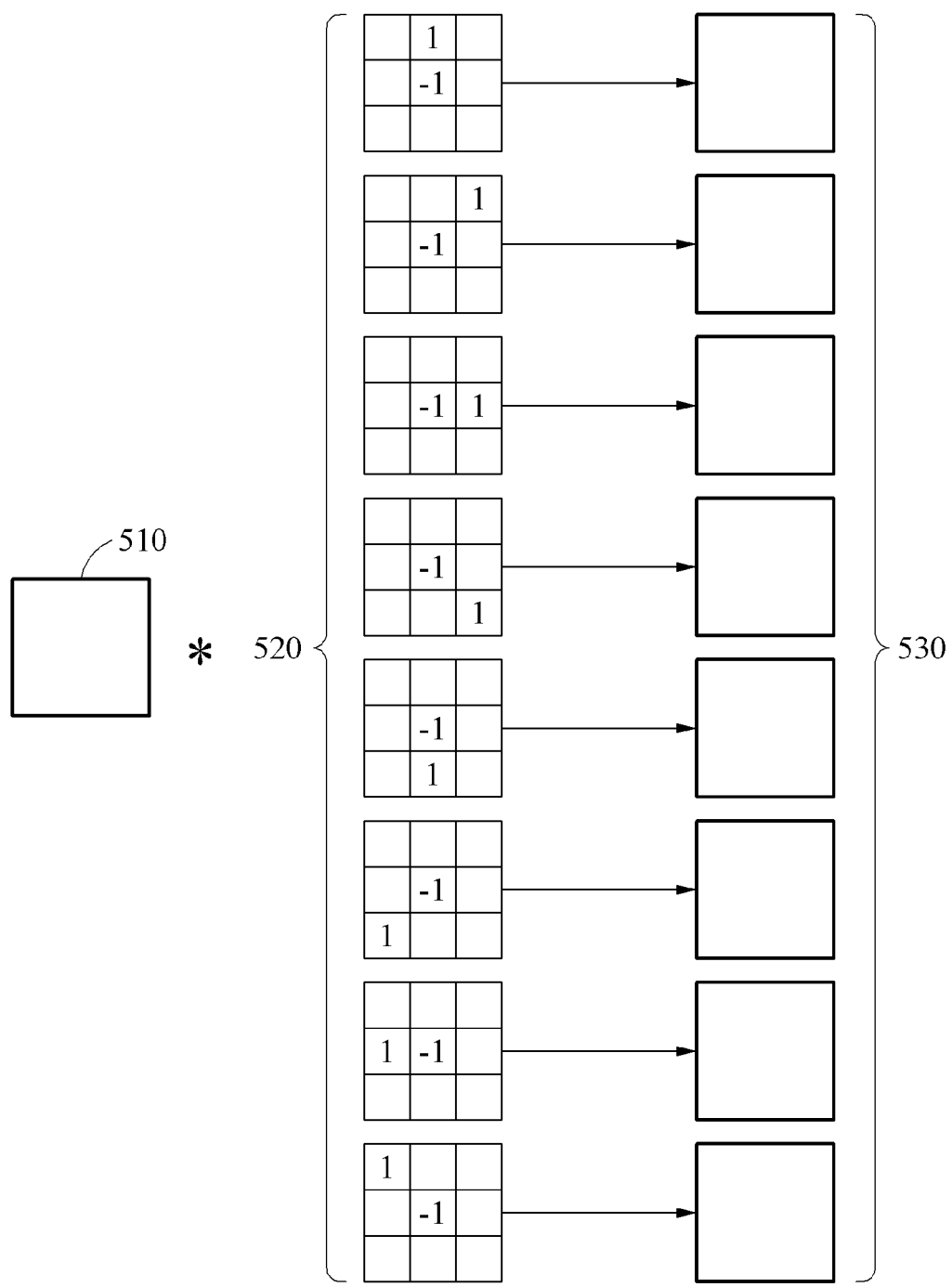
FIG. 5 illustrates an example of acquiring a low-bit image.

FIG. 5 illustrates an example of acquiring a low-bit image.

Referring to FIG. 5, an apparatus for acquiring feature data may acquire low-bit images 530 by applying, to an input image 510, different edge filters 520 having different filter coefficient structures. For example, when a number of bits per pixel of the input image 510 is 8 bits, the apparatus may acquire eight binary images as the low-bit images 530 by applying the eight edge filters 520 to the input image 510. In this example, a convolution operation may be performed on pixel values of the input image 510 and filter coefficients of the edge filters 520. Also, binary images may be acquired by binarizing result images of the convolution operation. In the example of FIG. 5, each of the edge filters may have a size of 3×3 and areas other than areas of "−1" and "1" may include a coefficient value of "0".

Figure 6:
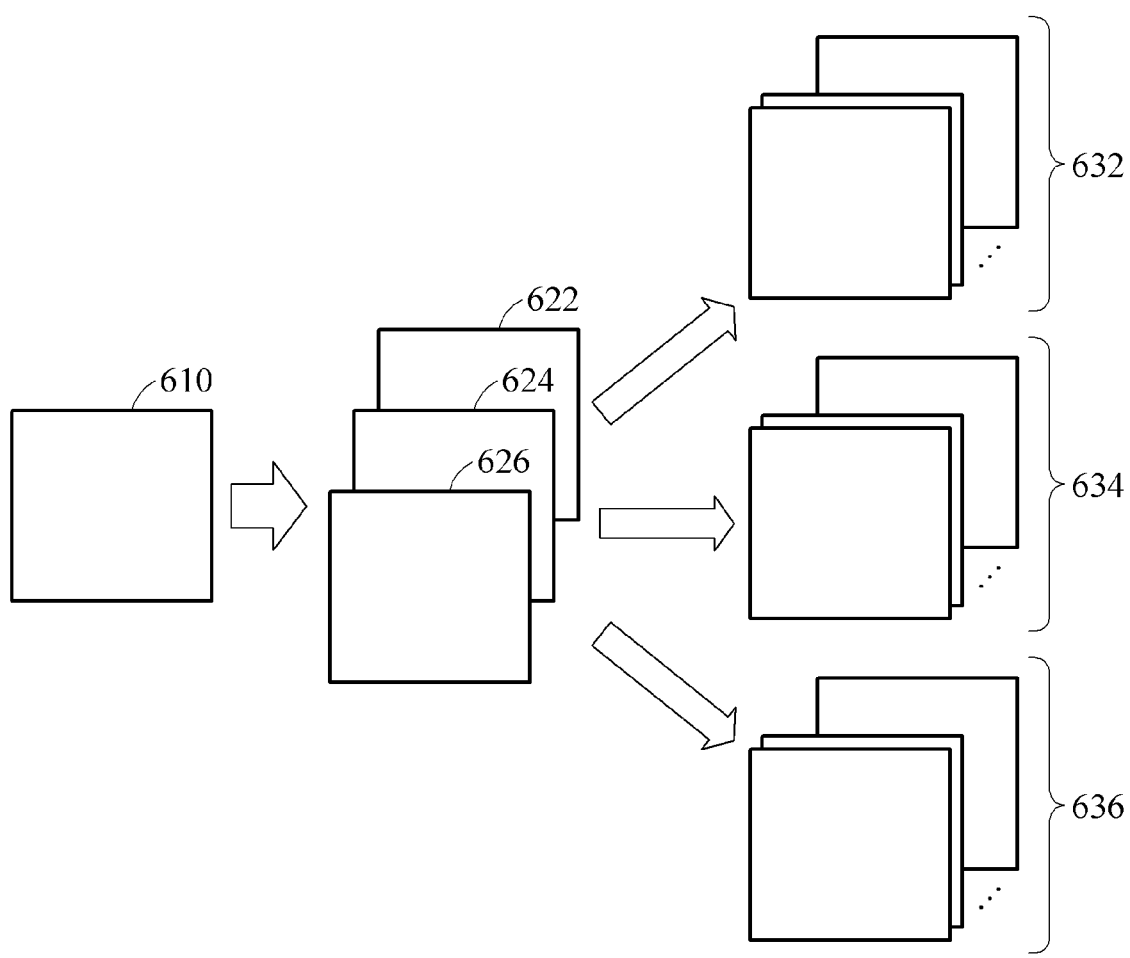
FIG. 6 illustrates an example of acquiring a low-bit image from a color image.

FIG. 6 illustrates an example of acquiring a low-bit image from a color image.

Referring to FIG. 6, an input image 610 may be an RGB color image and a number of bits per pixel of the input image 610 may be 24 bits (that is, 3 bytes). An apparatus for acquiring feature data may generate three color channel images 622, 624, and 626 corresponding to color channels of red, green, and blue by dividing the input image 610 for each of the color channels. In this example, a number of bits per pixel of each of the color channel images is 8 bits. Thereafter, the apparatus may divide each of the color channel images into binary images, each having 1 bits per pixels. Eight binary images 632 may be acquired based on a pixel value of the color channel image 622, eight binary images 634 may be acquired based on a pixel value of the color channel image 624, and eight binary images 636 may be acquired based on a pixel value of the color channel image 626. Since the description of FIGS. 3 through 5 is applicable here, repeated description of acquiring the binary images 632, 634, 636 will be omitted. All or a portion of 24 binary images including the binary images 632, 634, and 636 are input to a neural network. The neural network may output feature data corresponding to input data.

FIGS. 7 through 11 illustrate examples of a process of calculation in a neural network. In the examples of FIGS. 7 through 11, a neural network may be a convolutional neural network.

Figure 7:
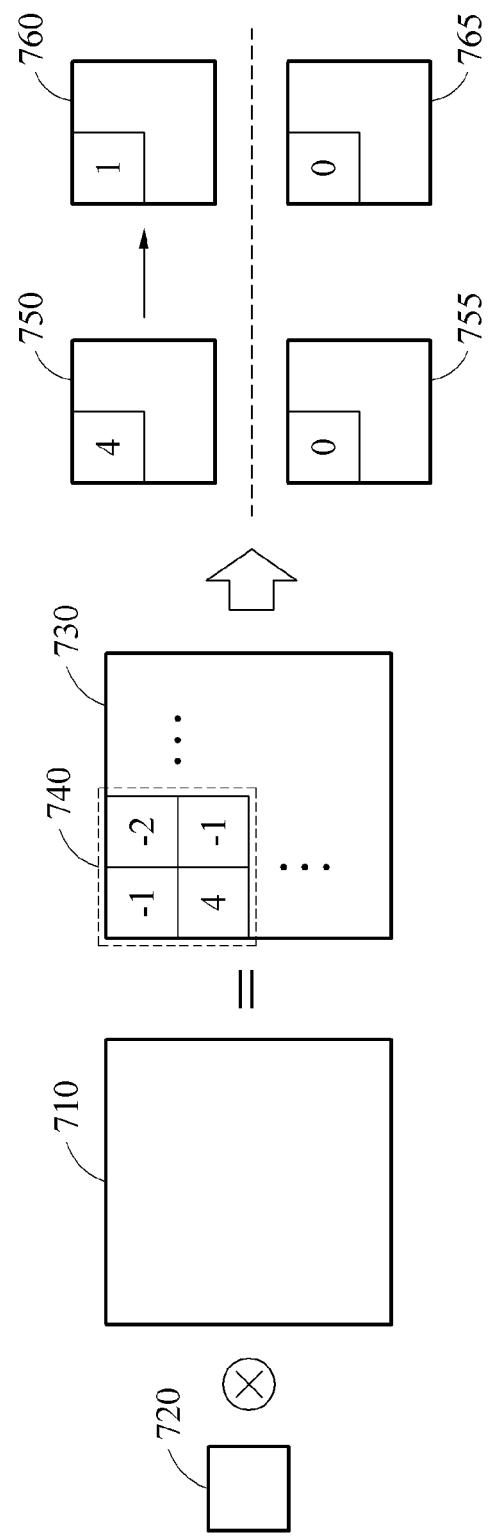
FIGS. 7 through 11 illustrate examples of a process of calculation in a neural network.

Referring to FIG. 7, convolution and pooling processes may be performed on a single low-bit image 710. In the neural network, a feature map may be acquired by applying an image filter 720 to the low-bit image 710. In this example, a convolution operation may be performed between a pixel value of the low-bit image 710 and a coefficient of the image filter 720. As a result of the convolution operation, four feature values included in an area of the feature map 730 may be determined to be "−1, −2, 4, and −1". Thereafter, pooling may be performed on the feature map 730 to reduce a volume or a size of the feature map 730. When max pooling is performed based on the size of the area 740 as a unit, "4" (which corresponds to a maximum value, which is obtained based on an absolute value, among the feature values "−1, −2, 4, and −1" included in the area 740) may be extracted as a single feature value of the area 740 in operation 750. Thereafter, ternarization may be performed. As a result of the ternarization, the feature value "4" may be converted into "1" in operation 760. The ternarization may be a process of converting a value into one of values of "−1", "0", and "1" (e.g., converting a value into "−1" if the value is a negative value, converting a value into "0" if the value is a zero value, and/or converting a value into "1" if the value is a positive value). Depending on examples, in addition to the ternarization, binarization may be performed to convert a value of a feature map into a value of "0" or "1", or bipolarization may be performed to convert a value of a feature map into a value of "−1" or "1". Similarly, in the examples of FIGS. 8 through 11, the binarization and the bipolarization may be performed in addition to the ternarization. When average pooling is performed on the feature map 730 instead of the max pooling, "0" (which is an average value of the feature values "−1, −2, 4, and −1" included in the area 740) may be determined to be the single feature value of the area 740 in operation 755. Thereafter, the ternarization may be performed, and the feature value "0" may be determined to be "0" as a ternarization result 765.

Figure 8:
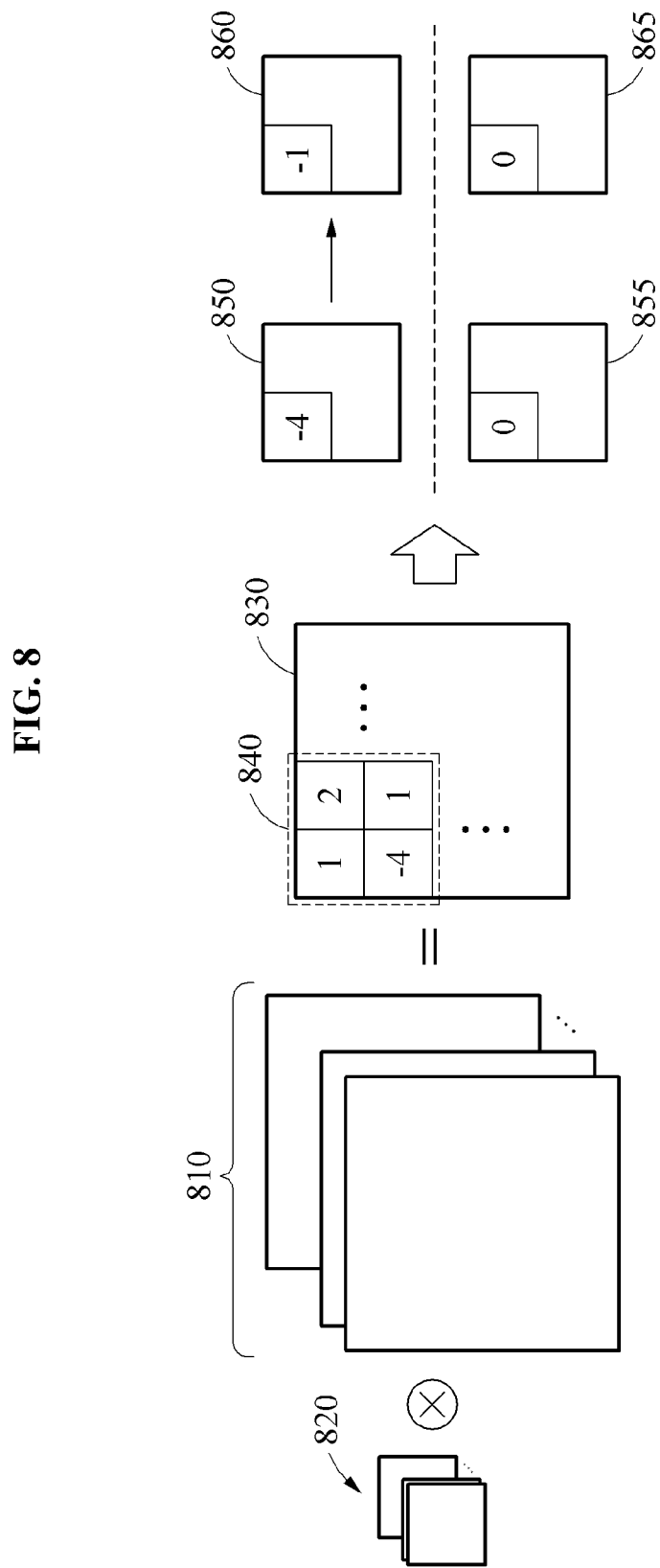

FIG. 8 illustrates convolution and pooling processes performed on a plurality of low-bit images 810. In a neural network, a feature map 830 may be acquired by applying an image filter 820 to the low-bit images 810. In this example, a convolution operation may be performed between a pixel value of each of the low-bit images 810 and a coefficient of the image filter 820. As a result of the convolution operation, four feature values included in an area 840 of the feature map 830 may be determined to be "1, 2, −4, and 1". When max pooling is performed, "−4" (which corresponds to a maximum value, which is obtained based on an absolute value, among the feature values "1, 2, −4, and 1" included in the area 840) may be extracted as a single feature value of the area 840 in operation 850. Thereafter, ternarization may be performed, so that the feature value "−4" may be converted into "−1" in operation 860. When average pooling is performed instead of the max pooling, "0" (which is an average value of the feature values "1, 2, −4, and 1" included in the area 840) may be determined to be the single feature value of the area 840 in operation 855. Thereafter, the ternarization may be performed, and the feature value "0" may be determined to be "0" as a ternarization result 865.

Figure 9:
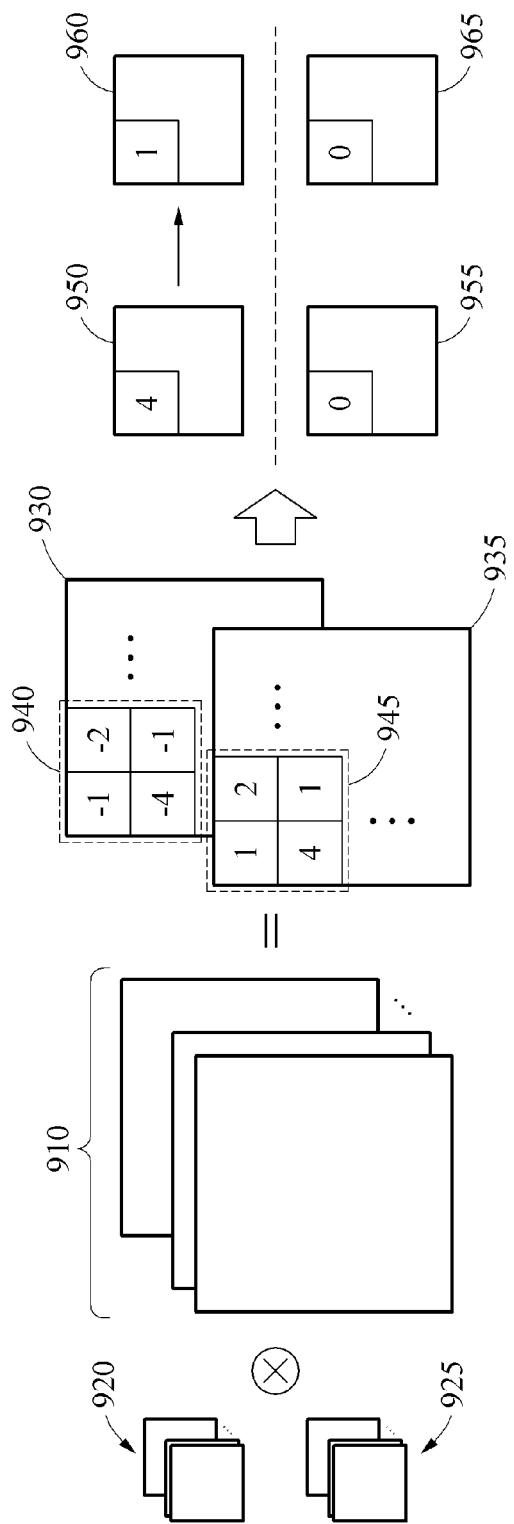

FIG. 9 illustrates convolution and pooling processes performed on low-bit images using two different image filters. In a neural network, a first feature map 930 may be acquired by applying a first image filter 920 to low-bit images 910 and a second feature map 935 may be acquired by applying a second image filter 925 to the low-bit images 910. In this example, a convolution operation may be performed between a pixel value of each of the low-bit images 910 and coefficients of the first image filter 920 and the second image filter 925.

As a result of the convolution operation, four feature values included in an area 940 of the first feature map 930 may be determined to be "−1, −2, −4, and −1" and four feature values included in an area 945 of the second feature map 935 may be determined to be "1, 2, 4, and 1". When max pooling is performed, "4" (which corresponds to a maximum value, which is obtained based on an absolute value, among the feature values "−1, −2, −4, and −1" included in the area 940 and the feature values "1, 2, 4, and 1" included in the area 945) may be extracted as a single feature value in operation 950. Thereafter, ternarization may be performed, so that the feature value "4" may be converted into "1" in operation 960. When average pooling is performed instead of the max pooling, "0" (which is an average value of the feature values "−1, −2, −4, and −1" included in the area 940 and the feature values "1, 2, 4, and 1" included in the area 945) may be determined to be the single feature value in operation 955. Thereafter, the ternarization may be performed, and the feature value "0" may be determined to be "0" as a ternarization result 965.

Figure 10:
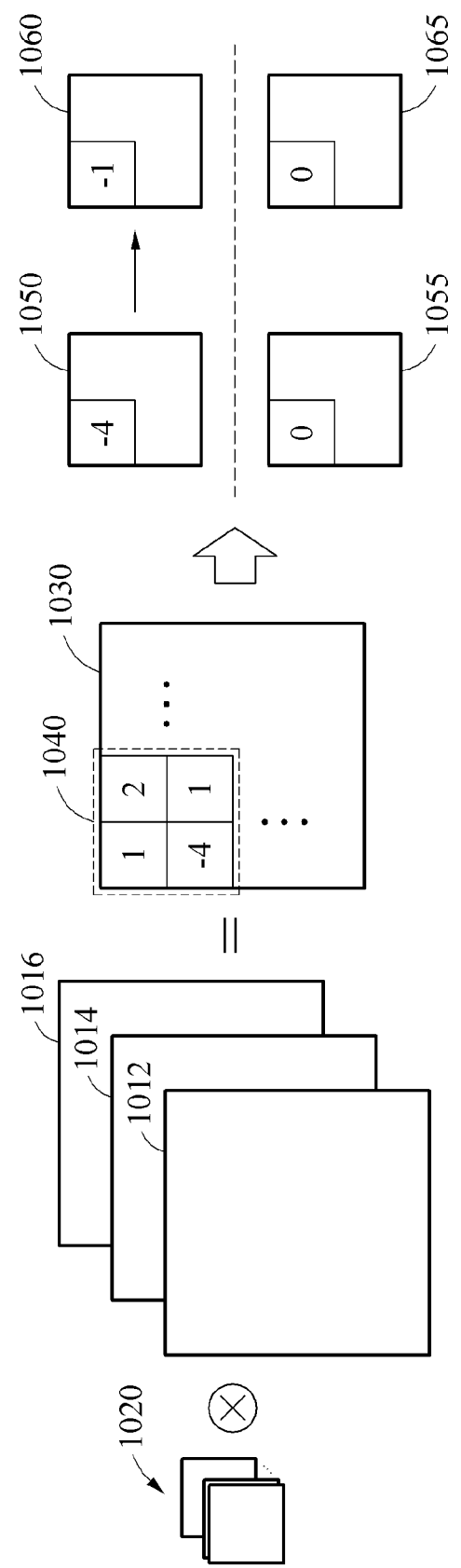

FIG. 10 illustrates convolution and pooling processes performed on low-bit images 1012, 1014 and 1016 of color channel images. When a color image is divided into three different color channel images and then each of the color channel images is divided into a plurality of low-bit images, an image filter 1020 may be applied to the low-bit images 1012, 1014 and 1016 of color channels corresponding to the same bit value level among the low-bit images of each of the color channel images. For example, the low-bit image 1012 may be a binary image corresponding to a highest bit among binary images of a red color channel, the low-bit image 1014 may be a binary image corresponding to a highest bit among binary images of a green color channel, and the low-bit image 1016 may be a binary image corresponding to a highest bit among binary images of a blue color channel. Accordingly, the low-bit images 1012, 1014, and 1016 may each correspond to a same bit value level (e.g., a highest bit).

A feature map 1030 may be acquired by applying the image filter 1020 to the low-bit images 1012, 1014 and 1016 (for example, performing a convolution operation on to the low-bit images 1012, 1014 and 1016 using the image filter 1020). In this example, four feature values included in an area 1040 of the feature map 1030 may be determined to be "1, 2, −4, and 1". When max pooling is performed, "−4" (which corresponds to a maximum value, which is obtained based on an absolute value, among the feature values "1, 2, −4, and 1" included in the area 1040) may be extracted as a single feature value in operation 1050. As a ternarization result 1060, the feature value "−4" may be converted into "−1". When average pooling is performed instead of the max pooling, "0" (which is an average value of the feature values "1, 2, −4, and 1" included in the area 1040) may be determined to be the single feature value in operation 1055. Also, as a ternarization result 1065, the feature value "0" may be determined to be "0."

Figure 11:
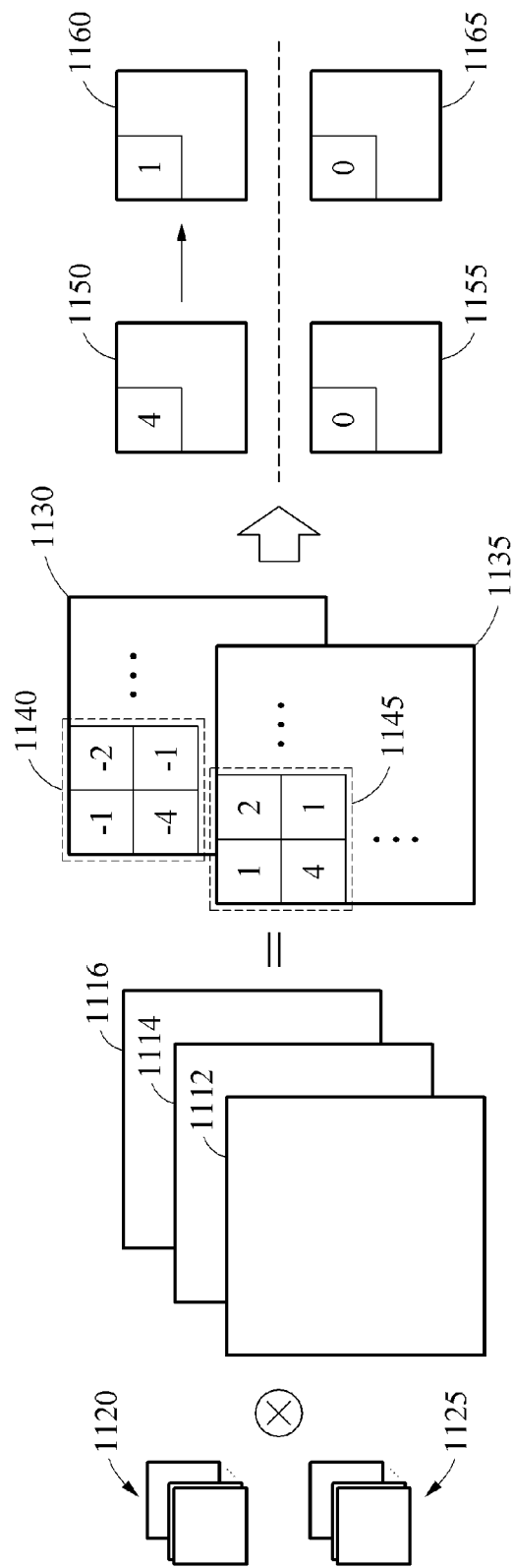

FIG. 11 illustrates convolution and pooling processes performed by applying two image filters (for example, a first image filter 1120 and a second image filter 1125) to low-bit images 1112, 1114, and 1116. A first feature map 1130 and a second feature map 1135 may be acquired by applying the first image filter 1120 and the second image filter 1125 to the low-bit images 1112, 1114 and 1116 (for example, performing a convolution operation on to the low-bit images 1112, 1114 and 1116 using the first feature map 1130 and the second feature map 1135).

As a result of the convolution operation, four feature values included in an area 1140 of the first feature map 1130 may be determined to be "−1, −2, −4, and −1" and four feature values included in an area 1145 of the second feature map 1135 may be determined to be "1, 2, 4, and 1". When max pooling is performed, "4" (which corresponds to a maximum value, which is obtained based on an absolute value, among the feature values "−1, −2, −4, and −1" included in the area 1140 and the feature values "1, 2, 4, and 1" included in the area 1145) may be extracted as a single feature value in operation 1150. As a ternarization result 1160, the feature value "4" may be converted into "1". When average pooling is performed instead of the max pooling, "0" (which is an average value of the feature values "−1, −2, −4, and −1" included in the area 1140 and the feature values "1, 2, 4, and 1" included in the area 1145) may be determined to be the single feature value in operation 1155. Also, as a ternarization result 1165, the feature value "0" may be determined to be "0."

Figure 12:
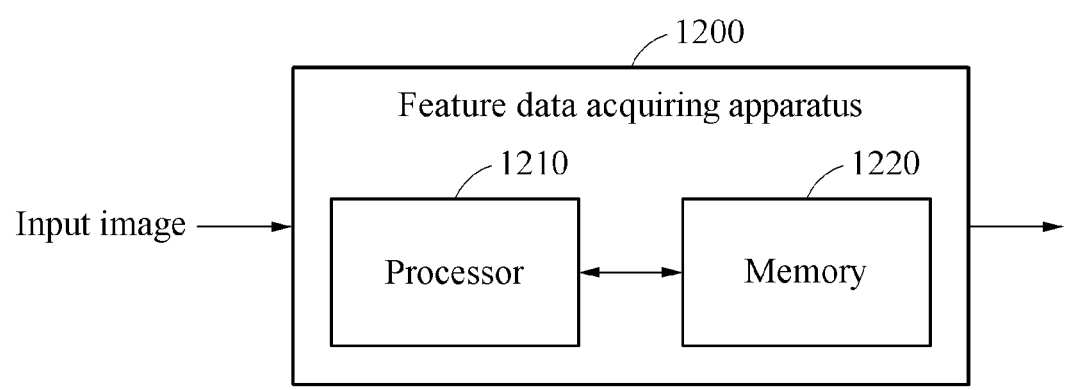
FIG. 12 illustrates an example of an apparatus configured to acquire feature data.

FIG. 12 illustrates an example of an apparatus for acquiring feature data.

Referring to FIG. 12, a feature data acquiring apparatus 1200 may receive an input image and may extract feature data from the input image. The feature data acquiring apparatus 1200 may perform one or more operations illustrated or described in the present disclosure in association with a feature data acquiring method.

The feature data acquiring apparatus 1200 may include at least one processor 1210 and a memory 1220. In an example, the at least one processor may be representative of one or more processors. The processor 1210 may execute instructions to perform at least one operation described with reference to FIGS. 1 through 11. The processor 1210 may receive an input image and may generate at least one low-bit image, for example, a binary image having a number of bits lower than a number of bits per pixel of the input image based on a pixel value of the input image. In one example, the processor 1210 may generate at least one binary image by dividing binary bit values corresponding to each pixel value of the input image based on a bit value level. In another example, the processor 1210 may generate low-bit images by applying, to the input image, different edge filters corresponding to the number of bits per pixel of the input image. When the input image is a color image, the processor 1210 may generate a plurality of color channel images by dividing the color image for each color channel and may generate at least one low-bit image having a number of bits lower than a number of bits per pixel of a color channel image based on a pixel value of each of the color channel images. The processor 1210 may extract feature data corresponding to the input image from the at least one low-bit image using a neural network. A low-bit image may be input to the neural network. The neural network may output feature data corresponding to input data through a calculation based on internal parameters.

The memory 1220 may be connected to the processor 1210. The memory 1220 may store instructions to be executed by the processor 1210 and data to be calculated by the processor 1210 or data processed by the processor 1210. The memory 1220 may include a non-volatile computer readable media, for example, a high-speed random access memory and/or a non-volatile computer readable storage media.

Figure 13:
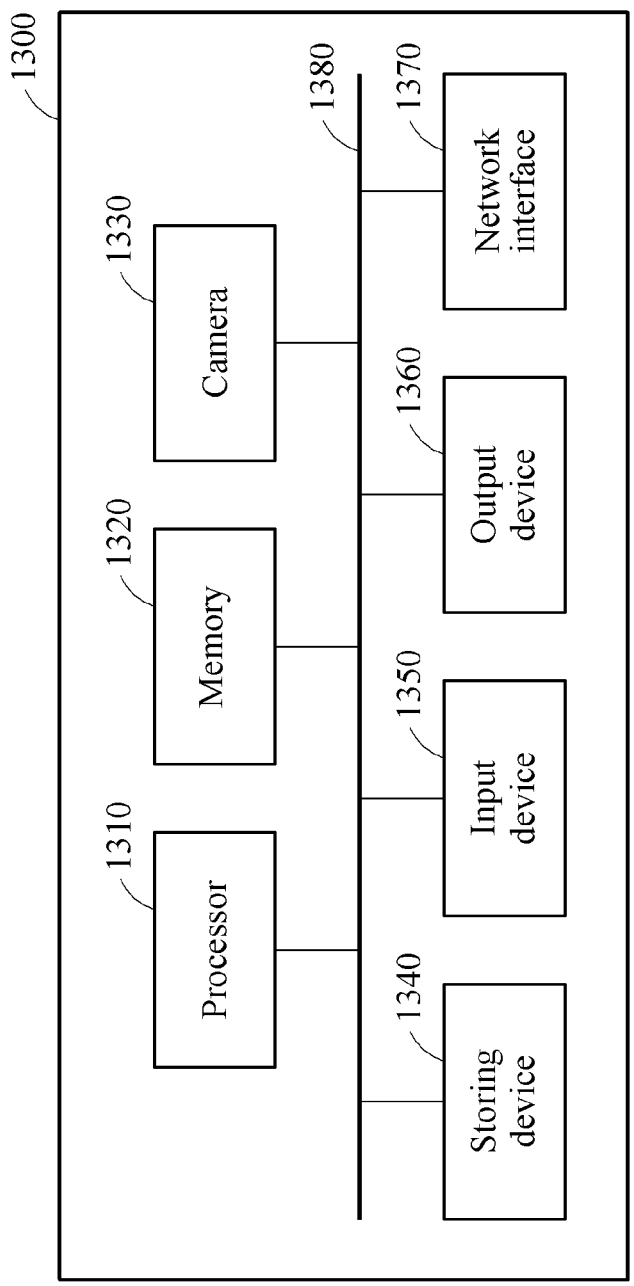
FIG. 13 illustrates an example of a computing apparatus.

FIG. 13 illustrates an example of a computing apparatus.

Referring to FIG. 13, a computing apparatus 1300 may extract feature data from target input data and may perform an application operation such as an object recognition based on the extracted feature data. The computing apparatus 1300 may include a function of the feature data acquiring apparatus 1200 of FIG. 12.

The computing apparatus 1300 may include a processor 1310, a memory 1320, a camera 1330, a storing device 1340, an input device 1350, an output device 1360, and a network interface 1370. The processor 1310, the memory 1320, the camera 1330, the storing device 1340, the input device 1350, the output device 1360, and the network interface 1370 communicate with one another via a communication bus 1380.

The processor 1310 may execute instructions and functions to be performed in the computing apparatus 1300. For example, the processor 1310 may process instructions stored in the memory 1320 or the storing device 1340. The processor 1310 may perform one or more operations described with reference to FIGS. 1 through 12.

The camera 1330 may capture either a still image or a video image, or both. An image captured by the camera 1330 may correspond to an input image of the present disclosure.

The storing device 1340 may store data used to extract feature data from the input image. The storing device 1340 may include a computer readable storage medium or a computer readable storage device. The storing device 1340 may store instructions to be executed by the processor 1310 and stores related data while software or an application is executed by the computing apparatus 1300.

The input device 1350 may receive an input from a user through a tactile, video audio, or touch input. The input device 1350 may include another device to detect the input from, for example, a keyboard, a mouse, a touch screen, a microphone, or a user and transfer the detected input to the computing apparatus 1300.

The output device 1360 may provide an output of the computing apparatus 1300 to the use through a visual, auditory, or tactile channel. The output device 1360 may include another device to provide the output to, for example, a display, a touch screen, a speaker, and a vibration generating device, or the user. The network interface 1370 may communicate with an external device through a wired or wireless network.

The above-described method of acquiring feature data may also be applied to extract feature data from an audio signal such as a voice signal and music in addition to an image. For example, when N bits (N being a natural number) are included in sample data in an audio signal, a feature data acquiring apparatus may decompose an N-bit audio signal into N items of 1-bit binary data and may input all or a portion of the N items of 1-bit binary data to a neural network, thereby acquiring feature data corresponding to the audio signal from the neural network. In this example, N items of binary data may be acquired by dividing binary bit values corresponding to a signal value of the audio signal based on a binary bit value level.

The apparatuses, units, modules, devices, and other components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of generating feature data, the method comprising:
    receiving an input image;
    generating N binary images from the input image, wherein N is the number of bits per pixel of the input image, wherein N is an integer equal to or greater than 2; and
    generating, using at least one neural network, feature data corresponding to the input image from the N binary images,
    wherein the generating N binary images from the input image comprises:
        generating each of the N binary images for each bit value level from a highest bit to a lowest bit of the binary bit values of a pixel value of the input image.

2. The method of claim 1, wherein at least one of the generated N binary images has a number of bits per pixel lower than a number of bits per pixel of the input image.

3. The method of claim 2, wherein the generating N binary images from the input image comprises:
    generating the N binary images by dividing binary bit values of the pixel value of the input image based on a bit value level.

4. The method of claim 1, wherein the generating N binary images from the input image comprises:
    generating the N binary images by applying N different edge filters to the input image.

5. The method of claim 4, wherein the generating N binary images from the input image comprises:
    generating each of the N binary images by applying a corresponding different edge filter of the N different edge filters, respectively.

6. A processor-implemented method of generating feature data, the method comprising:
    receiving a feature map of an input image including pixels having a plurality of bit value levels;
    generating, for each of the bit value levels, a binary feature map including binary pixel values corresponding to pixels of the feature map that include a bit of the bit value level; and
    generating, using a neural network, feature data corresponding to the input image based on the generated binary feature maps,
    wherein the generating the binary feature map from the input image comprises:
        generating the binary feature map for each bit value level from a highest bit to a lowest bit of binary bit values of a pixel value of the input image.

7. The method of claim 6, wherein the generating of the feature data comprises performing convolution operations between one or more image filters and the binary feature maps.

8. The method of claim 6, further comprising performing an image recognition for the input image based on the generated feature data.

9. An apparatus for generating feature data, the apparatus comprising:
    one or more processors configured to:
    receive an input image;
    generate N binary images from the input image, wherein N is the number of bits per pixel of the input image, wherein N is an integer equal to or greater than 2; and
    generate, using at least one neural network, feature data corresponding to the input image from the N binary images,
    wherein, for the generating N binary images from the input image, the one or more processors are configured to:
    generate each of the N binary images for each bit value level from a highest bit to a lowest bit of the binary bit values of a pixel value of the input image.

10. The apparatus of claim 9, wherein at least one of the generated N binary images has a number of bits per pixel lower than a number of bits per pixel of the input image.

11. The apparatus of claim 10, wherein for the generating N binary images from the input image, the one or more processors are configured to:

generate the N binary images by dividing binary bit values of the pixel value of the input image based on a bit value level.

12. The apparatus of claim 9, wherein for the generating N binary images from the input image, the one or more processors are configured to:
   generate the N binary images by applying N different edge filters to the input image.

13. The apparatus of claim 12, wherein for the generating N binary images from the input image, the one or more processors are configured to:
   generate each of the N binary images by applying a corresponding different edge filter of the N different edge filters, respectively.

14. The apparatus of claim 9, wherein the apparatus further comprises:
   a camera configured for capturing the input image and providing the input image to the one or more processors.

15. The apparatus of claim 9, wherein the apparatus is one of a mobile phone, smart phone, a tablet, and a personal computer.

* * * * *